March 12, 1957        J. McL. LITTLE        2,784,434
DEVICE FOR CLEANING AND LUBRICATING RUBBER
Filed June 8, 1954        2 Sheets-Sheet 2
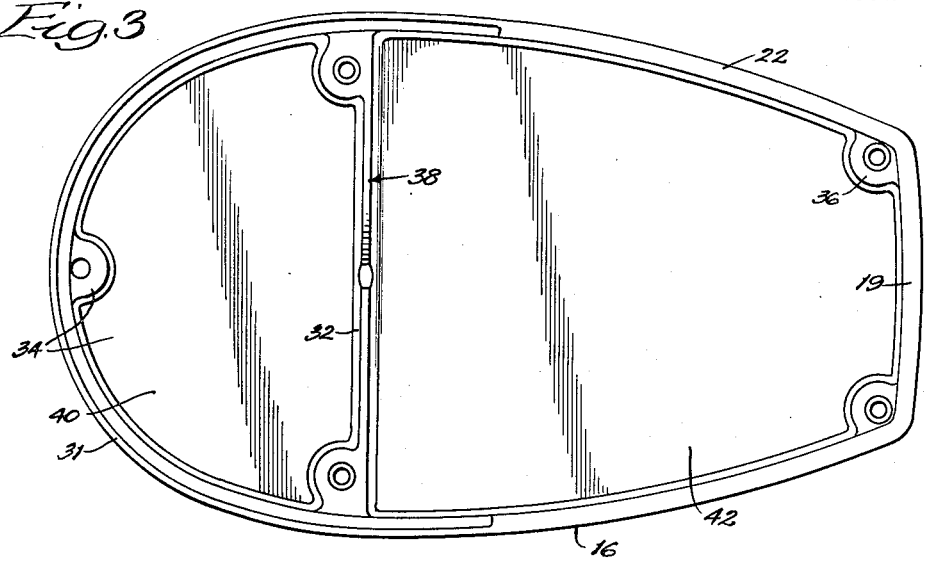
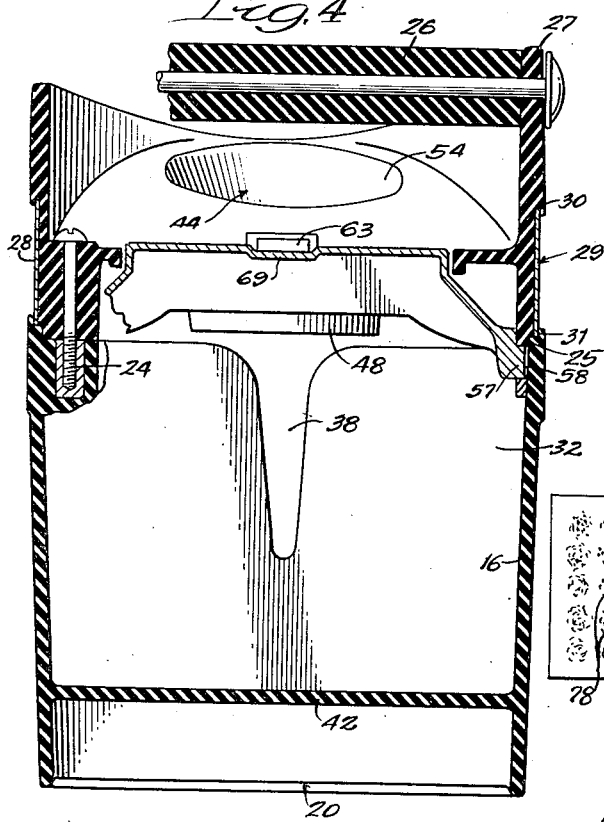
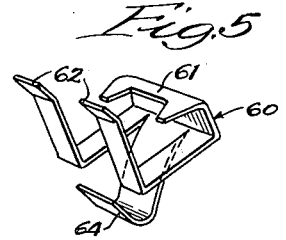
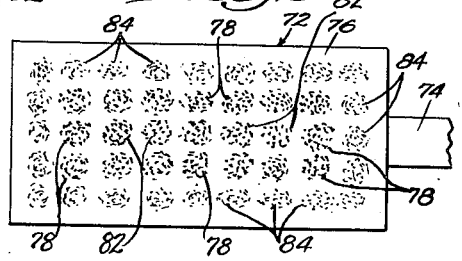
INVENTOR:
John McLeod Little,
BY
Osmo, McDougall, Williams & Hersh,
ATTORNEYS.

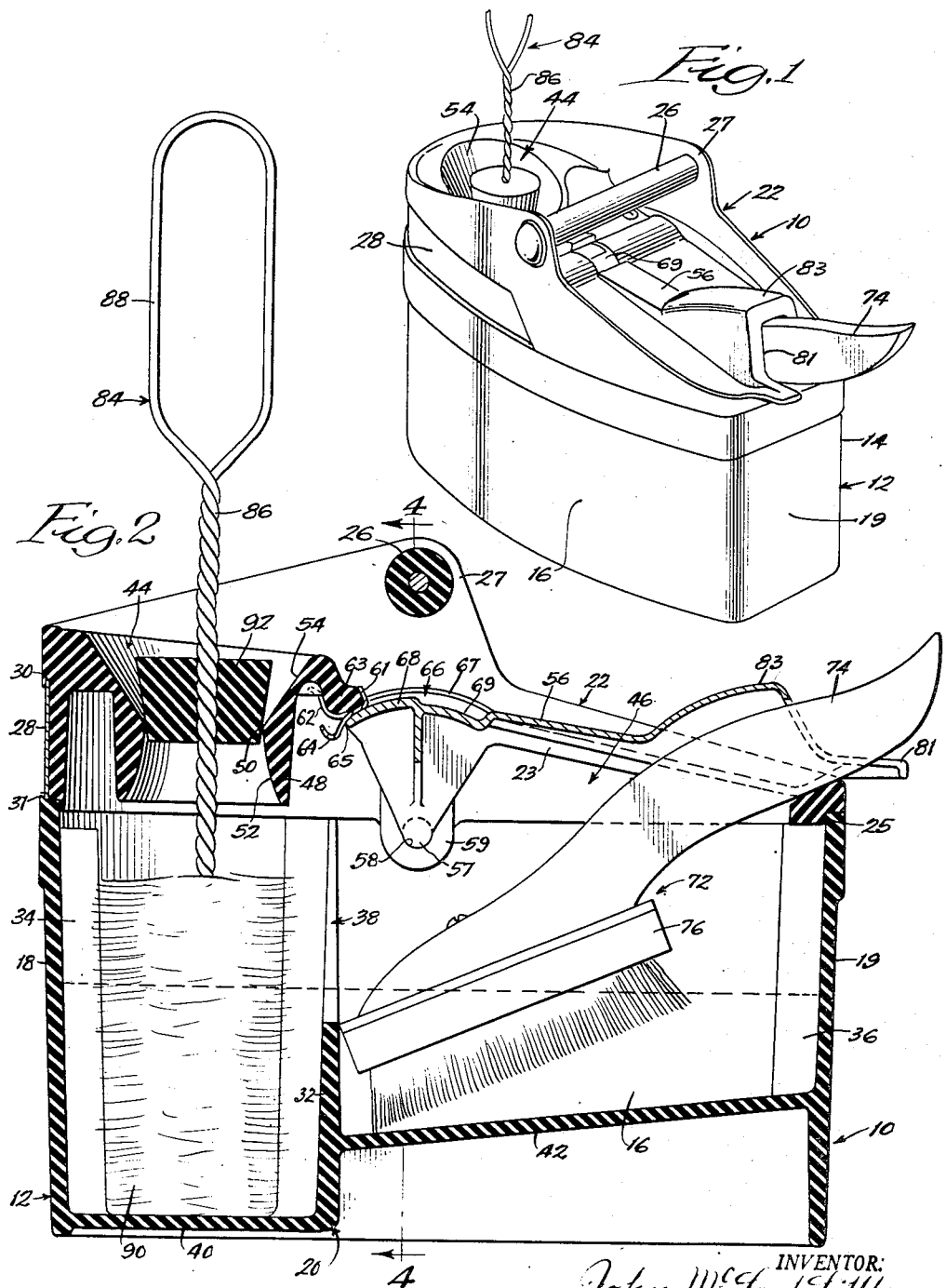

United States Patent Office 2,784,434
Patented Mar. 12, 1957

2,784,434

DEVICE FOR CLEANING AND LUBRICATING RUBBER

John McLeod Little, Toledo, Ohio, assignor to American Grease Stick Company, a limited partnership Application June 8, 1954, Serial No. 435,279

2 Claims. (Cl. 15—121.2)

This invention relates to a device for cleaning, refinishing and lubricating rubber articles such as tires, tubes, floor mats, weather stripping, moldings, stair treads and rubber footwear, for example.

An object of the invention is to provide a device which may be employed very advantageously for lubricating and cleaning rubber articles, with the aid of a rubber cleaning and lubricating liquid.

A further object is to provide a device of the foregoing character which affords a supply of the cleaning and lubricating liquid and includes utensils for cleaning rubber articles and for applying the liquid as a lubricant.

It is another object of the invention to provide a device for maintaining a portion of a body of liquid in a clean state, for application as a lubricant, while providing for the use of another portion of the same body of liquid for cleaning dirt and grime from rubber articles.

Another object is to provide a device which will hold a supply of a rubber cleaning liquid in such a manner as to prevent evaporation, spilling and splashing of the liquid while affording convenient access to the liquid for use in cleaning and lubricating rubber articles.

Still another object of the invention is to provide a rubber cleaning device of the foregoing character which is low in cost, convenient in use and readily portable.

Further objects and advantages of the invention will appear from the following description of an illustrative embodiment, shown in the accompanying drawings, in which:

Figure 1 is a general perspective view of an exemplary rubber cleaning, refinishing and lubricating device constructed in accordance with the invention.

Fig. 2 is a central, longitudinal, elevational sectional view of the device.

Fig. 3 is a plan view of the lower part of a tank embodied in the device, the remainder of the device being removed for clarity of illustration.

Fig. 4 is a transverse elevational sectional view, taken generally along a line 4—4 in Fig. 2.

Fig. 5 is an enlarged perspective view of a detent spring embodied in the exemplary device.

Fig. 6 is a view of the underside of a brush embodied in the cleaning device.

Considered in greater detail, the drawings illustrate a device 10 which is extremely useful for lubricating and restoring a new appearance to rubber articles, such as tires, mats, footwear and the like. The illustrated device 10 will be seen to include an elongated tank 12 which, in this instance, is made in a lower section 14 affording elongated side walls 16, end walls 18 and 19 and a bottom wall 20, together with an upper section 22, affording a top wall 23. Screws 24 or other suitable fasteners may be employed to join the sections 14 and 22. The sections may be molded out of rubber or a synthetic plastic material of medium hardness so that the tank 12 will be resilient and virtually unbreakable. To provide a liquid-tight joint between the sections, the upper section 22 may be formed with a recess 25 around its lower edge so that it will fit snugly within the lower section 41. In order that the tank 12 may be conveniently portable a handle 26 is connected between a pair of side flanges 27 extending upwardly on the upper section 22 above the side walls 16.

An elongated label 28 or the like may be mounted in a recess 29 formed along the lower edge of the upper section 22. Undercut grooves 30 and 31 may be formed in the upper and lower sections 22 and 14 around the recess 29 to receive and retain the edges of the label 28.

In order that the tank 12 may hold partially isolated supplies of a rubber cleaning liquid for use both in cleaning rubber articles and as a lubricant, a partition 32 is provided in the tank 12 extending between the elongated side walls 16. It will be seen that the partition 32 is located off center so as to define a deep and narrow well 34 adjacent one end wall 18 of the tank 12 and an elongated compartment 36 extending between the partition and the other end wall 19 of the tank. A limited degree of communication between the well 34 and the compartment 36 is provided by a vertical, generally V-shaped slot 38 formed through the partition 32 and extending partway down the partition to a level such that the cleaning and lubricating liquid may overflow from one compartment to the other.

To provide for ample depth of the liquid in the well 34, the bottom wall 20 is made with a stepped construction so as to form a bottom wall element 40 for the well, adjacent the bottom of the tank 12, while forming a bottom wall element 42 for the elongated compartment 36, at a substantially higher level. Thus the compartment 36 is substantially shallower than the well 34, with the result that a relatively small quantity of the cleaning liquid will be sufficient to fill the tank 12 to the desired level. It will be seen that the compartment bottom 42 slopes downwardly toward the partition 32 so that sediment will tend to gravitate toward the partition leaving the major part of the compartment bottom 42 relatively free from dirt and grime.

To afford access to the well 34 and the compartment 36, the upper wall 23 is formed with an opening 44, preferably circular in form, overlying the well 34, and an elongated opening 46 overlying the compartment 36. A depending annular flange 48 is formed around the circular opening 44 so that the latter may be provided with a narrow throat portion 50 overlying a downwardly flaring lower portion 52 and surmounted by an upwardly flaring upper portion 54. It will be seen that the upwardly flaring portion 54 may be employed as a funnel in filling the tank 12 with the cleaning liquid.

To minimize evaporation and prevent spilling and splashing of the cleaning liquid, the elongated opening 46 is fitted with a metal cover 56 which may be hinged on the tank 12 adjacent the partition 32 for upward swinging movement. It will be seen that the illustrated cover is provided with a pair of trunnions 57 pivoted in openings 58 formed in a pair of lugs 59 which project downwardly from the upper tank section 22. Provision is made for frictionally retaining the cover in its closed position and in any open position. To this end, the upper tank section 22 is fitted with a detent spring 60 (Fig. 5) having mounting fingers 61 and 62 embracing an enlarged lip 63 formed at one end of the elongated opening 46 adjacent

for frictionally retaining said cover in open and closed positions, a pair of side flanges extending upwardly on said tank above said side walls, and a carrying handle extending between said side flanges.

References Cited in the file of this patent

UNITED STATES PATENTS

| | | |
|---|---|---|
| 209,967 | Gesswein | Nov. 19, 1878 |
| 227,117 | Liebmann | May 4, 1880 |
| 430,077 | Jenness | June 10, 1890 |
| 706,296 | Bradley | Aug. 5, 1902 |
| 834,721 | Greve | Oct. 30, 1906 |
| 1,014,294 | Garvey | Jan. 9, 1912 |
| 2,043,301 | Nolzen | June 9, 1936 |
| 2,080,655 | Crawford | May 18, 1937 |

FOREIGN PATENTS

| | | |
|---|---|---|
| 8,731 | Great Britain | May 11, 1900 |